F. C. LEYPOLDT.
Button Hole Cutter.
No. 1,728
Reissued July 12, 1864.
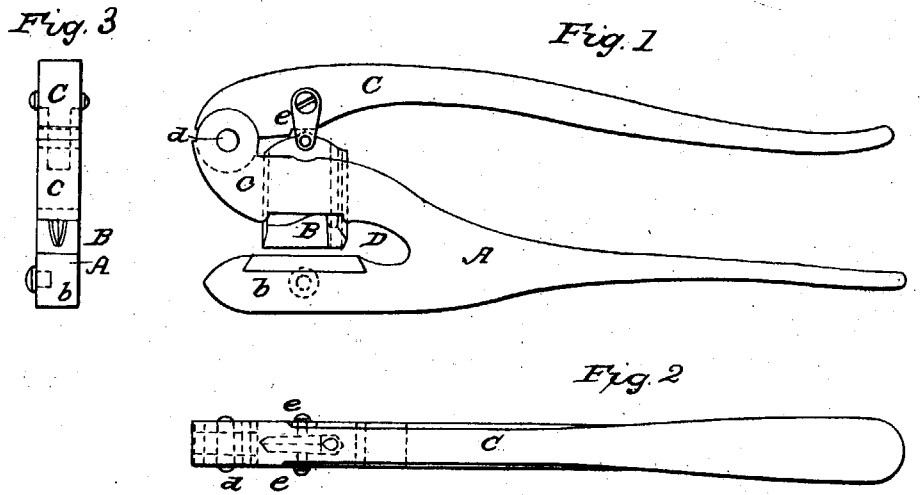
Witnesses
Theodore Bergner
John Rent
Inventor
Frederick C. Leypoldt
N. PETERS, Photo-Lithographer, Washington, D. C.

UNITED STATES PATENT OFFICE.

FREDERICK C. SEYPOLDT, OF PHILADELPHIA, PENNSYLVANIA.

IMPROVEMENT IN APPARATUS FOR CUTTING BUTTON-HOLES.

Specification forming part of Letters Patent No. 30,925, dated December 18, 1860; Reissue No. 1,728, dated July 12, 1864.

*To all whom it may concern:*

Be it known that I, FREDERICK C. LEYPOLDT, of the city of Philadelphia and State of Pennsylvania, have invented a new and useful Improvement in Instruments for Cutting Button-Holes; and I do hereby declare the following to be a full and exact description of the same, reference being had to the accompanying drawings, and to the figures and letters of reference marked thereon.

My invention relates to and is an improvement upon that kind of button-hole cutters which are composed of a pair of levers and operated in the manner of ordinary scissors.

It consists in an improved manner of combining the cutter with said levers, whereby a greatly-increased leverage is obtained and the pressure equally divided over the whole length of the cutting-edge.

To enable others skilled in the art to make and use my invention, I will now proceed to describe its construction and operation.

On reference to the drawings, forming part of this specification, and in which the same letters of reference allude to similar parts throughout the several views, Figure 1 is a side elevation of my improved cutter; Fig. 2, a plan, and Fig. 3 is an end view of the same.

A is the bottom lever. It is forked at the cutting end in the manner seen at Fig. 1, the lower prong, *b*, forming the die, against which acts the cutter B, while the upper projection, *c*, is arranged to receive and guide the latter. To the end of *c* is further hinged, by means of fulcrum-pin *d*, the upper lever, C, which actuates the cutter B by means of links *e e*.

In the instrument for cutting button-holes manufactured under the patent of Halsey D. Walcott, dated July 27, 1852, the cutting-edge is attached directly to the upper lever and the latter jointed to the lower lever at a point beyond the open space D in the manner of ordinary scissors. This open space D being necessary to permit the piercing of the button-holes at any usual distance from the edge of the cloth, it will be easily understood that in those instruments the fulcrum is thus removed inadequately far from the cutting-surface. Another serious defect in the above instrument is the direct attachment of the cutter to the upper lever, whereby the extreme ends of the cutting-edge receive an unequal amount of pressure and motion, the least inaccuracy in the surfaces of the die and cutting-edge causing the instrument to work indifferently.

By my improved mode of jointing the levers A and C, I am enabled to place the fulcrum *d* at the most suitable distance from the cutter for obtaining increased power; and it will further be seen that by connecting the cutter B with lever *c* through the links *e e* the pressure is equally divided over the whole cutting-surface and a perfect and reliable action thus obtained.

It will be obvious to any intelligent mechanic that while the described form of my improved instrument is best suited for family use and for persons having only a limited and occasional use for the same, its general construction and the method of applying power may, without impairing the invention, be modified in various ways. For cutting heavy fabrics, and in large tailoring establishments having constant use of the instrument, its utility will be much increased by providing the lower part, A, with a foot or base and securing it permanently to the work bench or table and operating the lever C as in some seal-presses or hand-stamps, &c.

To make the instrument still more convenient and useful power may be applied to C with the foot by means of a treadle, thus permitting the use of both hands for adjusting the goods with increased accuracy and dispatch.

Having thus described the nature of my invention, I wish it to be understood that I do not claim any means of making the cutter and die adjustable for varying the length of the cut; but

What I claim as my invention, and desire to secure by Letters Patent, is—

An instrument for cutting button-holes wherein the cutter B is actuated by the described combination of levers A and C when these levers are jointed and otherwise arranged substantially as and for the purpose set forth.

FREDERICK C. LEYPOLDT.

Witnesses:

CHAS. E. PANCOAST,

THEODORE BERGNER.